United States Patent [19]

Bakewell, Jr. et al.

[11] 4,223,397
[45] Sep. 16, 1980

[54] TURBULENT FLOW DEVICE FOR TESTING HYDROPHONES

[75] Inventors: Henry P. Bakewell, Jr., Old Saybrook; Marguerite A. Johnson, Mystic, both of Conn.

[73] Assignee: The United States of America as represented by the Secretary of the Navy, Washington, D.C.

[21] Appl. No.: 42,174

[22] Filed: May 24, 1979

[51] Int. Cl.³ .............................................. H04R 29/00
[52] U.S. Cl. ..................................... 367/13; 73/1 DV
[58] Field of Search ................. 367/13; 73/1 DV, 148

[56] References Cited

U.S. PATENT DOCUMENTS 3,864,664  2/1975  Trott et al. ............................. 367/13

Primary Examiner—Richard A. Farley
Attorney, Agent, or Firm—Richard S. Sciascia; Arthur A. McGill; Prithvi C. Lall

[57] ABSTRACT

A turbulent flow apparatus for laboratory use that provides a turbulent flow field around the circumference of a cylindrical line array. The apparatus enables an evaluation of the response characteristics of the acoustic sensors in the line array to the resultant pressure field similar to the one present when the line array is towed at sea or is subject to flow. The apparatus includes a small cylindrical chamber which can be assembled around the portion of a line array under test. Water from a source is supplied at one end of the chamber through inlets and a turbulent flow is attained by the water as it comes out of the opposite end of the chamber. The portion of the array containing the hydrophones under test are placed in the water to simulate the flow environment encountered at sea.

6 Claims, 4 Drawing Figures

TURBULENT FLOW DEVICE FOR TESTING HYDROPHONES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to test evaluations of hydrophones in a line array under different flow conditions and particularly an apparatus which simulates the water flow conditions which are prevalent at sea when an acoustic line array is towed therethrough.

In most underwater acoustic detection systems subject to flow, the flow is characteristically turbulent resulting in a locally very intense fluctuating pressure field on the surface of the structure surrounding the acoustic sensors. In the case of cylindrical line arrays of large length-to-diameter ratio, the typical lengths are so large as to preclude flow testing in conventional wind or water tunnels. Furthermore, few flow facilities are acoustically quiet enough to permit evaluation of the acoustic response of line arrays under various flow conditions. While tests have been conducted on simulated short lengths of cylindrical line arrays in conventional types of flow facilities, such tests are costly and depend on very critical care in setting up the experiment and are very limited in the sense of the length and diameter of the array segment under test. As much as the actual modules of line array cannot be accommodated in existing test facilities, at-sea testing has heretofore always been required to evaluate towed line array performance. It is thus desirable to have a simple system to evaluate towed line array performance and which can simulate different turbulent conditions to which a line array at sea is subjected to.

SUMMARY OF THE INVENTION

Turbulent flow device for testing flow response of a line array hydrophone according to the teachings of subject invention is a turbulent flow apparatus for laboratory use which provides a turbulent flow field around the circumference of a cylindrical line array, thereby enabling the evaluation of the response characteristics of the acoustic sensors in the line array. The resultant fluctuating pressure field produced by this device simulates the conditions on the line array when towed at sea or moved in the presence of a current. The device includes a small cylindrical chamber fitted with a baffle having a plurality of openings therein. Water is passed through the cylindrical chamber through inlets on one side of the chamber and is evenly distributed within the chamber by the baffle. The water leaving the opposite end of the chamber develops a turbulent flow field which is channeled into a long cylindrical tube where the hydrophones under test are placed to test them under simulated sea conditions.

An object of subject invention is to provide a means of evaluating the response of acoustic sensors in line arrays of different construction details in a controlled flow environment simulating the conditions found at sea.

An additional object of the invention is to provide a portable flow testing equipment which can be used in any suitable tank, lake or any other body of water.

Still another object of subject invention is to provide a device for flow testing of acoustic line arrays which utilizes existing water supplies and pressures, thereby obviating the necessity of complex flow producing apparatus.

Other objects, advantages and novel features of the invention will become apparent from the following detailed description of the drawings when considered in conjunction with the accompanying drawings wherein:

DESCRIPTION OF A PREFERRED EMBODIMENT

Figure 1:
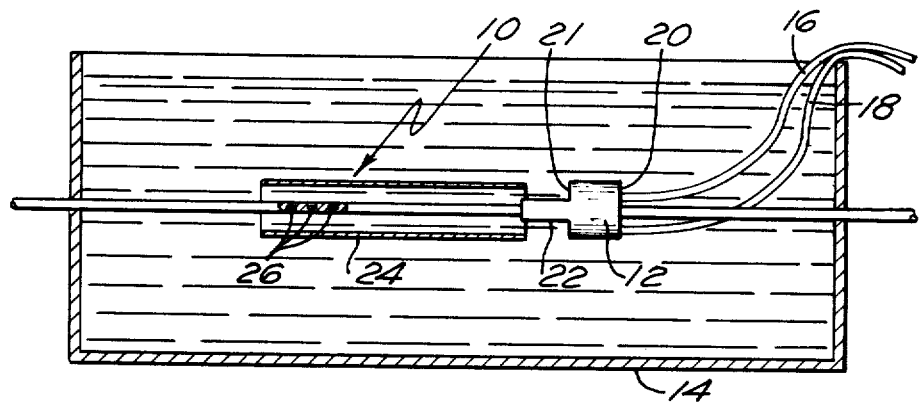
FIG. 1 is a schematic representation of the device built according to the teachings of subject invention.
Figure 2:
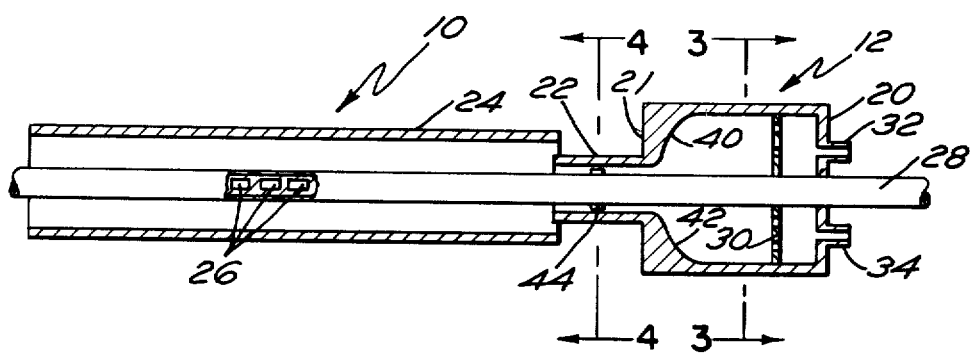
FIG. 2 is a cross-sectional view of the device shown in FIG. 1.
Figures 3, 4:
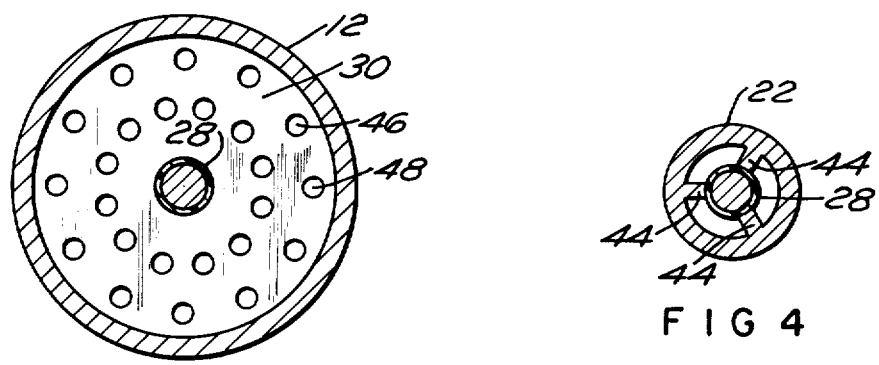
FIG. 3 is a cross-section of FIG. 2 taken along line 3—3 of FIG. 2.
FIG. 4 is a cross-section of FIG. 2 taken along line 4—4 of FIG. 2.

Referring to the drawings, FIG. 1 shows a turbulent flow device 10 for laboratory use and for evaluating the responses of acoustic sensors in a cylindrical line array built according to the teachings of subject invention. It includes a cylindrical chamber 12 placed in a tank 14 full of water. The chamber surrounds a portion of the line array under test. Water from an available source is supplied via hoses 16 and 18 connecting to side 20 of the chamber 12. Water issues from end 21 through nozzle 22. Tube 24 surrounds the end of nozzle 22 in order to minimize the reduction in the velocity of the water coming out of nozzle 22 due to the spreading of the annular jet flow field with increasing distance from the nozzle. Acoustic sensors 26, housed in a portion of line array 28 under test are placed inside tube 24. The portion of line array under test with the flow device 10 may be suspended horizontally in tank 14 filled with water. As shown in FIG. 2, hoses 16 and 18 go to inlets 32 and 34 in side 20 of the cylindrical chamber 12. A baffle 30 is placed inside cylindrical chamber 12. Edges 40 and 42 of chamber 12 are smoothed out to obtain a uniform flow of the water flowing therethrough, the curve being described by a polynominal appropriate for nozzle design. Fins 44 are located in nozzle 22 in order to keep line array 28 in position. Baffle 30 includes a plurality of openings such as 46 and 48 in order to make the flow of water inside chamber 12 uniform in nature. Centering fins 44 are shown in FIG. 4.

In operation, water is supplied to the flow device through hoses 16 and 18. The water issues through nozzle 22 to form an annular turbulent flow that surrounds acoustic sensors contained in a portion of line array 28. The flow device can be moved along the line array so that the response of each acoustic sensor is evaluated with the flow device located at the same distance to permit valid comparisions of various sensors to the same flow field. Tube 24 is used to prevent reduction in the velocity of water coming out of nozzle 22. This is desirable due to the spreading of the annular turbulent jet flow field with increasing distance downstream of the nozzle.

Briefly stated, a turbulent flow device for testing flow response of an acoustic line array hydrophone includes a cylindrical chamber having inlets through which water is admitted to the chamber. A baffle is housed in the chamber to make the water flow uniform inside the chamber and the water is made to exit the opposite face of the chamber through a nozzle, the front end of which is enclosed in a tube in which the portion of line array under test is enclosed. A retaining device is housed in the nozzle to keep the line array in position. A plurality of openings are used in the baffle located inside the chamber for making the water uniform turbulent in nature.

Obviously, many modifications and variations of the present invention may become apparent in the light of the above teachings. As an example, the device may be made of two halves which are clamped around the line array at the desired test location. Furthermore, the device may be used in a position with the line array portion in a vertical position. Furthermore, various components of the flow device may be made from different materials. It is therefore understood that within the scope of the appended claims the invention may be practiced otherwise than as specifically described.

We claim:

1. Turbulent flow apparatus for simulating flow conditions at sea for an acoustic line array comprising:
    a generally cylindrical chamber having inlet means for allowing water to flow therein at one end thereof and outlet means for letting water to flow out of said chamber at the opposite end thereof, said chamber adapted to be surrounded around the portion of the acoustic line under test;
    means for distributing water evenly inside said chamber;
    means for obtaining a uniform flow of water through said chamber;
    retaining means for positioning the portion of the acoustic line array under test relative to said turbulent flow apparatus; and
    means for preventing a reduction in flow velocity of water flowing out of said chamber in a longitudinal region proximate said chamber for testing the portion of the acoustic line array under test.

2. The apparatus of claim 1 wherein said means for distributing water evenly inside said chamber includes a baffle having a plurality of openings therein for water to flow therethrough.

3. The apparatus of claim 2 wherein said means for obtaining a uniform flow of water through said chamber includes contoured edges surrounding the water flowing out end of said box.

4. The apparatus of claim 1 wherein said retaining means for positioning the portion of the acoustic line array under test relative to said turbulent flow apparatus includes a plurality of fins housed in a nozzle for allowing water to flow out of said chamber.

5. The apparatus of claim 1 wherein said means for preventing a reduction in flow velocity of water flowing out of said chamber in the longitudinal region proximate said chamber includes a tube having longitudinal axis thereof generally collinear with the longitudinal axis of said chamber.

6. The apparatus of claim 5 wherein said tube is placed adjacent the end of a nozzle for allowing water to flow out of said chamber.

* * * * *